United States Patent
Compton et al.

(10) Patent No.: US 8,050,252 B2
(45) Date of Patent: Nov. 1, 2011

(54) PACKET-BASED VIDEO NETWORK INDICATING VIDEO SIGNAL SYNCHRONIZATION AND METHODOLOGY THEREOF

(75) Inventors: Matthew Compton, Winchester (GB); Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 992 days.

(21) Appl. No.: 11/093,525

(22) Filed: Mar. 30, 2005

(65) Prior Publication Data

US 2005/0220194 A1     Oct. 6, 2005

(30) Foreign Application Priority Data

Mar. 31, 2004   (GB) .................................. 0407314.4

(51) Int. Cl.
*H04L 12/66*  (2006.01)
*H04J 3/06*   (2006.01)
*G06F 1/12*   (2006.01)
*G06F 13/42*  (2006.01)
*H04L 5/00*   (2006.01)
*H04L 7/00*   (2006.01)

(52) U.S. Cl. ........ 370/352; 370/353; 370/354; 370/355; 370/356; 370/503; 713/400

(58) Field of Classification Search ................. 370/503
See application file for complete search history.

(56) References Cited

U.S. PATENT DOCUMENTS

| | | | | | |
|---|---|---|---|---|---|
| 5,467,137 | A | * | 11/1995 | Zdepski | 375/240.29 |
| 5,517,236 | A | * | 5/1996 | Sergeant et al. | 348/143 |
| 6,038,276 | A | * | 3/2000 | Dinh | 375/376 |
| 6,366,768 | B1 | * | 4/2002 | Tessier et al. | 455/260 |
| 6,405,275 | B1 | * | 6/2002 | Morrow et al. | 710/305 |
| 6,529,969 | B1 | * | 3/2003 | Inoue | 710/33 |
| 6,687,752 | B1 | * | 2/2004 | Falco et al. | 709/230 |
| 6,810,045 | B1 | * | 10/2004 | Brune et al. | 370/498 |

(Continued)

FOREIGN PATENT DOCUMENTS

GB     2 385 684     8/2003

(Continued)

OTHER PUBLICATIONS

Patent Abstracts of Japan, Publication No. 2001346144, Publication Date Dec. 14, 2001.

*Primary Examiner* — Daniel J Ryman
*Assistant Examiner* — Andrew Oh
(74) *Attorney, Agent, or Firm* — Oblon, Spivak, McClelland, Maier & Neustadt, L.L.P.

(57) ABSTRACT

A video data network device arranged to receive a video signal and an associated synchronisation signal and to launch video data packets representing the video signal onto a packet-based data network comprises means for detecting whether the video signal is synchronised with the synchronisation signal; and means for launching data onto the network indicating whether the video signal is synchronised with the synchronisation signal.

17 Claims, 3 Drawing Sheets

U.S. PATENT DOCUMENTS

| | | | |
|---|---|---|---|
| 6,914,637 B1* | 7/2005 | Wolf et al. | 348/473 |
| 6,963,561 B1* | 11/2005 | Lahat | 370/356 |
| 2003/0056136 A1* | 3/2003 | Aweya et al. | 713/400 |
| 2003/0162495 A1* | 8/2003 | Yonemoto et al. | 455/7 |
| 2003/0174734 A1* | 9/2003 | Compton et al. | 370/503 |
| 2003/0206559 A1* | 11/2003 | Trachewsky et al. | 370/509 |
| 2004/0062278 A1* | 4/2004 | Hadzic et al. | 370/503 |
| 2004/0102693 A1* | 5/2004 | Jenkins | 600/410 |
| 2004/0141446 A1* | 7/2004 | Kamon | 369/53.36 |
| 2004/0165666 A1* | 8/2004 | Kubo et al. | 375/240.28 |
| 2004/0246995 A1* | 12/2004 | El Kolli et al. | 370/503 |
| 2005/0002402 A1* | 1/2005 | Fairman | 370/395.5 |
| 2005/0036512 A1* | 2/2005 | Loukianov | 370/469 |

FOREIGN PATENT DOCUMENTS

| | | |
|---|---|---|
| GB | 2 400 255 | 10/2004 |
| GB | 2 400 265 | 10/2004 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
                            timestamp
+-+-+-+-+-+-+-+-+-+-+-+-+-+-+-+-+-+-+-+-+-+-+-+-+-+-+-+-+-+-+-+-+
           synchronization source (SSRC) identifier
+=+=+=+=+=+=+=+=+=+=+=+=+=+=+=+=+=+=+=+=+=+=+=+=+=+=+=+=+=+=+=+=+
             contributing source (CSRC) identifiers
                                ....
+-+-+-+-+-+-+-+-+-+-+-+-+-+-+-+-+-+-+-+-+-+-+-+-+-+-+-+-+-+-+-+-+
```

Fig. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|V|  Type   |P| Z |     Scan Line (SL)    |   Scan Offset(SO)    |
+-+-+-+-+-+-+-+-+-+-+-+-+-+-+-+-+-+-+-+-+-+-+-+-+-+-+-+-+-+-+-+-+
```

Fig. 8

PACKET-BASED VIDEO NETWORK INDICATING VIDEO SIGNAL SYNCHRONIZATION AND METHODOLOGY THEREOF

BACKGROUND OF THE INVENTION

1. Field of the Invention

The present invention relates to packet-based video networks.

2. Description of the Prior Art

It is known to link video and audio devices in a television studio together using a switching device, typically a cross point switch.

A system has been proposed which links audio and video devices in a studio by a packet-switched local area network, for example an Ethernet network, operating with a known protocol such as Internet Protocol (IP). However most, if not all, current video and audio equipment used in studios is not equipped to operate with such a switched network operating according to such a protocol.

The audio and video devices used in a studio include cameras, editors, audio mixers, video tape recorders (VTRs) and play-out switches amongst other examples. It is also known to use monitors to view video which is being played out or to preview on monitors video which is available to be played out.

One of the obstacles to providing circuit-switched studio functionality in a packet-switched network is that video and audio signals have stringent timing and synchronisation requirements. Typically, a video source will be locked to at least two timing signals, a bit clock and a frame synchronisation clock. Copending applications 0204242.2 and 0307459.8 deal with techniques to allow synchronisation of both individual data bits and video frames over a packet-based network. In particular, at a video source node on the network, a video signal is synchronised to reference clock signals. At a receiving node elsewhere on the network, a local clock is synchronised to the reference clock signals, and video data packets received from the source node are handled in synchronism with the local clock.

SUMMARY OF THE INVENTION

This invention provides a video data network (e.g. source) device arranged to receive a video signal and an associated synchronisation signal and to launch video data packets representing the video signal onto a packet-based data network, the device comprising:

means for detecting whether the video signal is synchronised with the synchronisation signal; and means for launching data onto the network indicating whether the video signal is synchronised with the synchronisation signal.

The invention also provides a video data network device arranged to receive from a packet-based network: video data; timing data indicating the frequency and/or phase of a reference synchronisation signal; and synchronisation data indicating whether the video data at the source device was synchronised with the reference synchronisation signal;

the device comprising:

means for synchronising a local synchronisation signal to the reference synchronisation signal using the timing data;

means for outputting the video data in accordance with the local synchronisation signal; and means for associating an indicator with the video data in dependence on the synchronisation data.

The invention recognises that although the copending applications provide useful techniques for synchronising the reference (source) and local (receiver) clocks, they do not necessarily handle so-called unlocked video signals successfully. The reason for this will now be explained.

An "unlocked" video signal is one which is not synchronised to the reference clock. If no action is taken, this lack of synchronisation can lead to disturbing visual artefacts such as image movement, so-called frame rolls etc. The best way to avoid these problems, if possible, is to ensure that the video is synchronised at source. Where this is not possible (for example, where a camera is located in a helicopter), devices known as time base correctors (TBCs) can correct this situation and adjust the timing of a video signal so as to lock it to a reference clock, but of course an operator needs to know that a TBC is required in respect of a particular signal.

In a circuit-switched studio, it is easily apparent when a video source is unlocked, from the artefacts described above. In a packet-switched network of the type described above, however, it may go unnoticed within the studio environment that a video source is unlocked. This is because the receiver node (which has no indication that the source is unlocked) will attempt to reconstruct and output the packets of video data in accordance with its local clock, which in turn is synchronised to the reference clock at the source. This will tend to cut down, though not remove entirely, the visible evidence that the source was originally unlocked.

Where the data rate is exactly the same and there is a fixed phase relationship between the source and the reference frame synchronisation signals, the lack of lock can potentially be completely masked in this way. However, if the data rates are different, or where the phase with respect to the reference frame synchronisation signal varies, there can be an apparent excess or a lack of data in respect of a frame for output at the receiver.

So, the problem recognised by the present invention is that in a packet-switched network of the type described above: (a) a lack of synchronisation is not communicated from a source to a receiver node; and (b) the receiver node will tend to mask the adverse effects of an unlocked video signal, so it will be harder for a user to notice the lack of lock.

The invention addresses this problem by providing a detection, at the network source, of whether the video data is properly locked to the synchronisation signal, and then launching data onto the network to indicate the presence or absence of lock. Correspondingly, at the network receiver, although the video data is output in (or as near as possible to) synchronism with a local synchronisation signal, the lock/unlock data is also detected and an indicator associated with the video data to indicate whether the video data was in lock at the source node.

Accordingly, the invention provides a way of mimicking, in a packet-based network, the effect of the presence or absence of lock in a circuit-switched network.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 7 schematically illustrates a real time protocol (RTP) packet header; and FIG. 8 schematically illustrates a BT.656 packet header.

DESCRIPTION OF THE PREFERRED EMBODIMENTS

Figure 1:
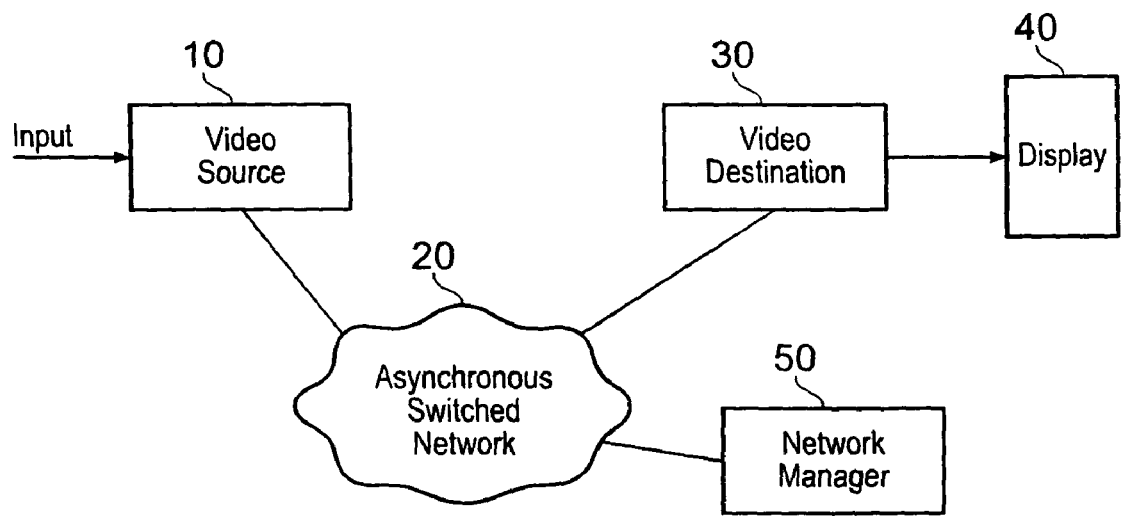
FIG. 1 is a schematic block diagram of a network in a studio.

Referring to FIG. 1, a network is installed in for example a studio. The network comprises one or more source audio/video AV devices 10 such as cameras, video tape recorders, digital signal processors (DSPs) etc. The network further comprises one or more destination group AV devices 30 such as a video switch, a monitor (having a display 40), a video processor etc. An Ethernet asynchronous switched network 20 provides connections between source devices and destination devices. The source nodes and destination nodes are connected to the network using Enhanced Network Interface Cards, which differ from a standard network interface cards as described in the copending applications mentioned above and also the copending application 0307426.7. The network and the nodes attached to it are, unless specified otherwise in the present description, of the types described in the copending applications. Each source node and destination node is connected to one or more ENIC ports. The network manager 50 keeps track of the mappings between ENIC ports and AV devices.

The network is an Ethernet multicast network, which is an asynchronous nGigabit Ethernet switch 2, where n is 1 or 10 for example. It will be appreciated that a destination node may also act as a source and a source node may also act as a destination for different data exchange events on the network.

In a conventional studio, the source nodes, e.g. cameras and the destination nodes e.g. video processors are connected by a cross point switch. The conventional cross point switch requires specific known devices to be connected to corresponding specific known ports on the switch to ensure that they can be connected together via the switch. By way of contrast, the network of FIG. 1 is configured by a network manager 50 to provide virtual circuit-switched connections that emulate a crosspoint switch at least to the extent that any one or more source nodes can be connected to any one or more destination nodes. The virtual circuit-switched connections are facilitated by implementation, in the arrangement of FIG. 1, of an Internet Protocol (IP) multicast network that uses a known protocol, IGMP (Internet Group Management Protocol). The multicast network enables transmission of data from one source device to several destination devices belonging to a predetermined multicast group across the network and IGMP provides a means of identifying which multicast group a source device or destination device belongs to. Each source device and destination device is assigned an identifier and predetermined source device identifiers and destination device identifiers are associated with a given multicast address in order to define the virtual connections. Unlike the conventional cross point switch network, in the network of FIG. 1 the actual physical network ports of the Ethernet network to which the source devices and destination devices are connected are irrelevant because the connections are flexibly specified using the identifiers and multicast addresses and associated communication protocols.

For sending streams of audio and video data from the source devices to the destination devices, the transport layer is UDP multicast. The audio and video data are carried in Real-Time Protocol (RTP) format, and in particular by a so-called BT.656 format within a UDP packet. This applies to the audio data, the full resolution video and the low resolution proxy video. RTP provides functions to support real-time traffic, that is, traffic that requires time-sensitive reproduction at the destination application. The services provided by RTP include payload type identification (e.g. video traffic), sequence numbering, time-stamping and delivery monitoring. RTP supports data transfer to multiple destinations via multicast distribution if provided by the underlying network. The RTP sequence numbers allow the receiver to reconstruct the original packet sequence. The sequence numbers may also be used to determine the proper location of a packet. RTP does not provide any mechanism to ensure timely delivery, nor does it provide other Quality of Service guarantees.

When a destination node wishes to receive audio and/or video data from a source node, the destination node sends an IGMP join message to join the multicast group of the data it needs to receive.

A packet of audio or video data comprises, in order, an Ethernet header, an IP multicast header, a UDP header, an RTP header, a field specifying the type of payload, the payload, and a CRC (cyclic redundancy check) field. The Ethernet header comprises a source Ethernet address and a destination multicast Ethernet address. The IP multicast header comprises the source ENIC IP address and the destination device multicast IP address. There are several different IP address classes e.g. Class A has the first 8-bits allocated to the network ID and the remaining 24-bits to the host ID whereas Class B has the first 16 bits allocated to the network ID and the remaining 16-bits to the host ID. Class D IP addresses are used for multicasting. The four left-most bits of a Class D network address always start with the binary pattern 1110, corresponding to decimal numbers 224 to 239, and the remaining 28 bits are allocated to a multicast group ID. IGMP is used in conjunction with multicasting and Class D IP addresses.

The set of hosts (i.e. source and/or destination devices) listening to a particular IP multicast address is called a host group. A host group may span multiple networks and membership of a host group is dynamic. The Class D IP address is mapped to the Ethernet address such that the low-order 23 bits (of 28) of the multicast group ID are copied to the low-order 23 bits of the Ethernet address. Accordingly 5 bits of the multicast group ID are not used to form the Ethernet address. As a consequence the mapping between the IP multicast address and the Ethernet address is non-unique i.e. 32 different multicast group IDs map to the same Ethernet address.

The UDP header comprises source and destination port numbers, which are typically associated with a particular application on a destination device. Note that UDP is redundant in the case of multicast messages since in this case the multicast group address identifies the stream/content. The audio/video streams are transported using RTP protocol. Forward Error Correction (FEC) may be used for certain data streams e.g. full resolution video streams to provide a level of protection against data corruption due to network errors. FEC is provided using a known RTP payload format that provides for FEC. FEC is a parity-based error protection scheme.

A known extension to the RTP protocol allows a video scan line number to be specified in the RTP payload header. The RTP header also comprises a field to specify whether 8-bit or 10-bit video is present. Although known RTP and RTP/FEC protocol formats provide the data packet fields necessary to transport audio and video data over an IP network it may also be desired to transmit additional information such as source status and source timecode information. For example if the source device is a VTR then the timecode as stored on the tape should be transferred across the network. The source status information might indicate, for example, whether the VTR is currently playing, stopped or in jog/shuttle mode. This status information allows a user to operate the VTR from a remote network location. Since the timecode data and source status information is required only once per field, the information is transported in an RTP packet marked as vertical blanking. To allow audio and video resynchronisation, the RTP timecode is based on a 27 MHz clock. The payload type field contains data indicating the type of payload. i.e. video or audio data. The payload field contains the video or audio data to be transmitted. The CRC is a cyclic redundancy check known in the art.

The detailed packet arrangement will be described in more detail with reference to FIGS. 7 and 8 below.

Figure 2:
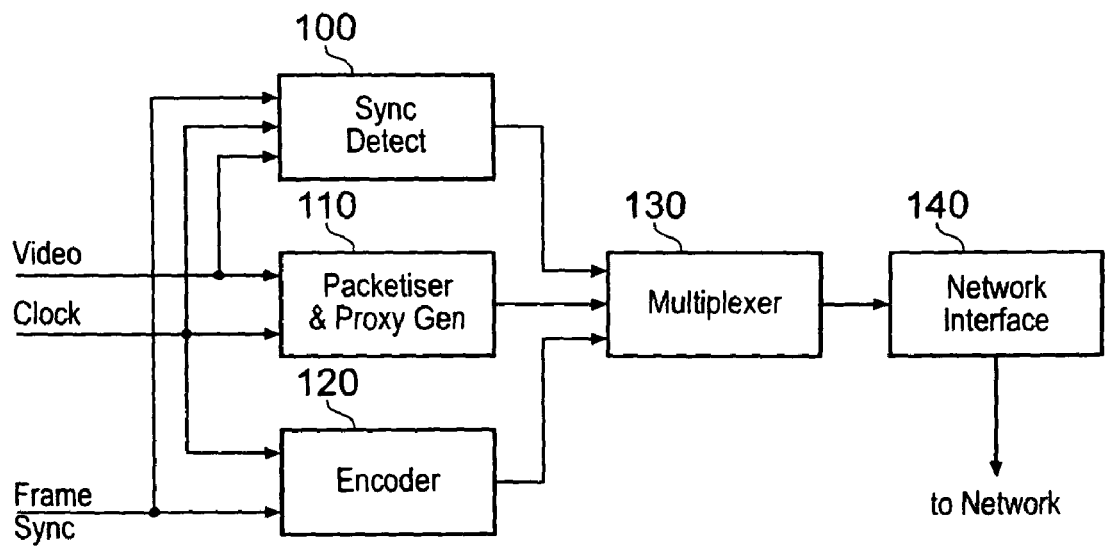
FIG. 2 is a schematic simplified diagram of a video source network node.

FIG. 2 is a schematic simplified diagram of a video source network node, comprising a synchronisation detector 100, a packetiser and proxy generator 110, an encoder 120, a multiplexer 130 and a network interface 140.

The packetiser and proxy generator 110 receives a digital video signal and an associated clock signal. From these, it generates data packets, in the format described above, each carrying a portion of the digital video data.

A proxy signal is also generated. This is a reduced bit rate version of the video signal with the following purpose.

Users of source group and destination group devices such as cameras, VTRs and video processors are likely to want to make editing decisions based on the content of the audio and/or video data streams and it is for this reason that AV proxy streams are generated. Although several known video formats stream video data across a network using RTP, these known methods involve heavy compression of the video data. Video compression methods that introduce significant periods (i.e. >one field) of delay are unsuitable for the studio production environment in which the network according to the present technique is likely to be deployed. Furthermore, in a production environment it is likely that multiple AV data sources will have to be displayed substantially simultaneously on a screen and this would place undue burden on the data processor to decompress the multiple data streams, perhaps requiring hardware acceleration. Accordingly, the video proxy is generated as an uncompressed sub-sampled data stream rather than a compressed data stream (e.g. QCIF (176 or 180 samples×144 lines); 16 bit RGB; 25 frames per second; sub-sampling with horizontal and vertical filtering; at 15.2 Mbits per second from a 625 lines×1440 samples per line source; or (180 samples×120 lines) from a 525 lines by 1440 samples source).

Data packets carrying the proxy signal are generated and are launched onto the network in a different multicast group to the packets of full bit rate video data.

The encoder 120 receives the clock and frame synchronisation signals relating to the video data. As described in the co-pending applications, these are encoded into network data packets which provide sufficient information for a "local" clock at the receiver node to be synchronised, in terms of its bit rate (frequency) and the occurrence of frame boundaries, to the source of the clock and frame synchronisation signal at the source node.

The synchronisation detector 100 detects, using known techniques, whether the received video data is synchronised or "locked" to the clock and frame synchronisation signals received by the source node. This can be an absolute detection, i.e. is there any phase or frequency difference between the video data and the clock and frame synchronisation signals. Alternatively, because the system at a destination node can compensate for a fixed (unvarying) non-zero phase difference between the input video and the reference frame synchronisation signal at the source node, a different detection could be used so that only a varying phase difference is detected as a lack of "lock".

It is noted that the clock signals at the source node could actually be generated by the source node and supplied from there to equipment providing the video signal. Or the source node could be incorporated into such video equipment. Or both the video equipment and the source node could receive externally generated reference clock signals. Where a system is unlocked, a further possibility is that the video equipment operates according to an internally generated clock, and the source node is receiving a different clock. The skilled man will understand that there are many permutations of clock sources applicable to this situation.

The multiplexer 130 receives: (a) an output from the synchronisation detector 100 indicating whether the video signal is currently locked; (b) video packets representing the video data and also the proxy (low bit rate) version generated from it; and (c) timing information generated by the encoder 120. The multiplexer 130 multiplexes all this information into network packets to be launched onto the network 20. In particular, as described in the copending applications referred to above, the timing information generated by the encoder 120 may be launched onto the network as separate timing packets or as a modified group of video data packets.

The output from the synchronisation detector 100 may be represented by a flag of one or more bits in header data associated with a video packet and may, for example, be included with every packet or in a subset of the video packets. The format of the flag data will be described below.

Finally the output from the multiplexer 130 is passed to the network interface 140 which provides the connection to the network 120.

Figure 3:
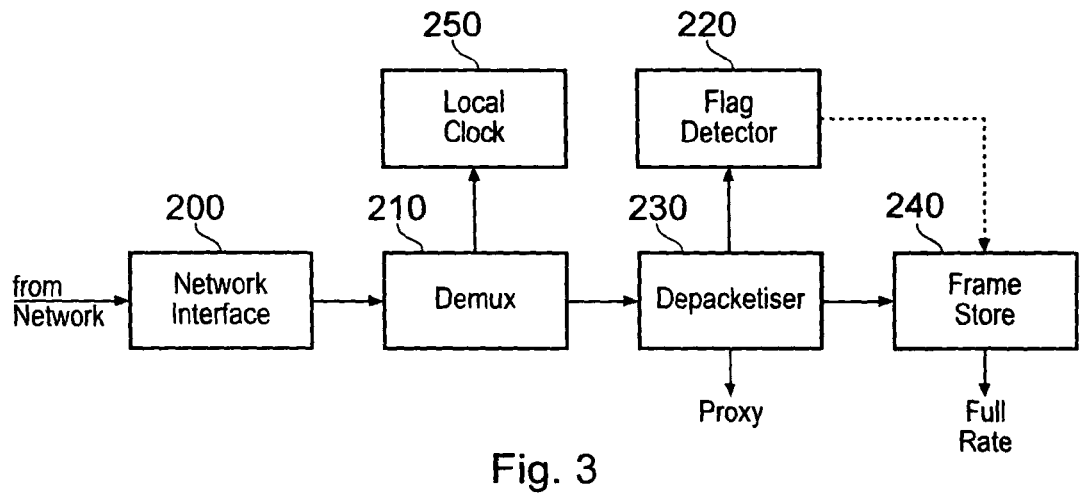
FIG. 3 is a schematic simplified diagram of a network video destination node.
Figure 4A:
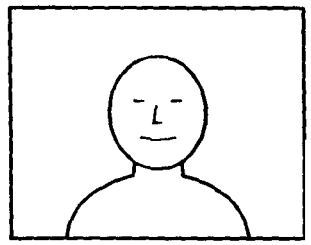
FIGS. 4*a* to 4*d* schematically illustrate a simulated frame roll.
Figure 4B:
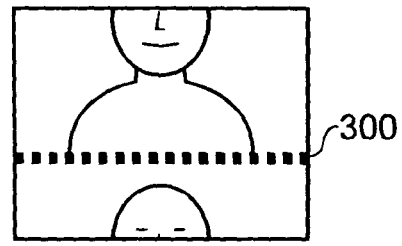
Figure 4C:
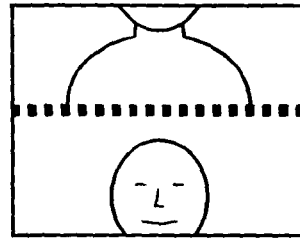
Figure 4D:
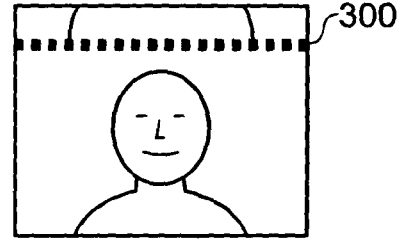

FIG. 3 is a schematic simplified diagram of a network video destination node, comprising a network interface 200, a demultiplexer 210, a flag detector 220, a depacketiser 230, a frame store 240 and a local clock generator 250.

The network interface 200 receives packets from the network and passes them to the demultiplexer 210, which separates the timing information (originally generated by the encoder 120), which is supplied to the local clock generator 250, from the video data packets which are supplied to the de-packetiser 230.

The local clock generator 250 uses the timing information to synchronise its bit rate and frame pulses to those which were supplied to the source node of FIG. 2. The output from the local clock 250 is used to synchronise the output of proxy and full rate video data at the destination node.

At the depacketiser 230, packets of proxy video and full rate video are separated, with the packets of full rate video being buffered in the frame store 240 for output. The synchronisation flag originally generated by the detector 100 is separated and passed to the flag detector 220. This is used to control the output of video data from the frame store 240. This will be described in more detail below.

In basic terms, the synchronisation flag is used to generate some sort of indicator in the output video signal from the frame store. The indicator may be some sort of visible degradation or alteration of the picture content and/or timing, and indicates to the user that there is a synchronisation problem at the source, so that the user may attend to the problem. Preferably a user control is provided to allow the indicator to be turned on and off. For example, if the output video is currently being broadcast, or if the particular circumstances mean that there is nothing that the user can do to resolve the synchronisation problem, then the indicator would be turned off and the video data used in its unlocked form.

The indicator could be applied to the full rate video, the proxy video or both. In the present example it is applied to the full rate video.

FIGS. 4a to 4d illustrate one way in which the detection of an "unlocked" flag in the received video data can be used to provide an indication to the user that there is a synchronisation problem at the source node. In particular, FIGS. 4a to 4d schematically illustrate a simulated frame roll in which, over the course of a number frames, the video data stored in the frame store 240 is output with a varying phase with respect to the frame synchronisation of the local clock. This is done so that the boundary 300 between the top and the bottom of the image moves progressively up or down the image as displayed.

Figure 5:
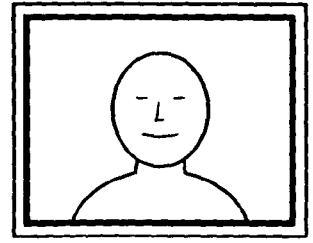
FIG. 5 schematically illustrates a simulated screen border.

FIG. 5 schematically illustrates a simulated border around the screen, which is displayed when the corresponding video data is detected to be "unlocked".

Figure 6:
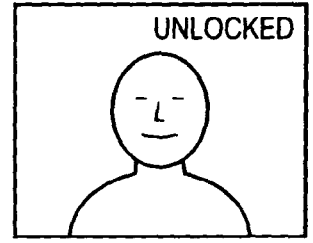
FIG. 6 schematically illustrates a screen message.

FIG. 6 schematically illustrates a message which is displayed over an image derived from a video signal which is detected to be unlocked.

FIG. 7 schematically illustrates an RTP packet header, having the following fields:
V RTP version number; current value is 2
P Padding bit: if set, the packet contains one or more additional padding bytes
X Extension bit: if set, the fixed header is followed by one header extension
CC The number of CSRC identifiers (see below)
M Marker bit: varying interpretation, but can be used to mark significant events such as frame boundaries PT Payload Type: identifies the AV format of the RTP payload The sequence number is incremented by one for each RTP packet sent, so the receiver can use it to detect packet loss and to restore the packet sequence. If RTP packets are generated periodically, the timestamp is set to the number of AV sampling clock ticks elapsed.

The synchronisation source (SSRC) identifier is a randomly chosen value meant to be globally unique within a particular RTP session. If a participant generates multiple streams in one RTP session, for example from separate video cameras, each must be identified as a different SSRC. The contributing source (CSRC) identifiers are present only in a mixed AV stream with multiple contributing sources.

FIG. 8 schematically illustrates a BT.656 packet header. This is an extension field which allows 525 line or 625 line video to be encapsulated within an RTP packet. This format specifies that each RTP packet contains all or a portion of one scan line. The fields are:
F F=0 signifies that the scan line belongs to the first field of a frame; F=1 signifies the second field.
V V=1 signifies that this scan line is part of vertical blanking
Type This represents the type of frame encoding within the payload. For the PAL system, for example, (13.5 MHz sample rate; 720 samples per line; 50 fields per second; 625 lines per frame) the type=1
P P indicates the required sample quantisation size. P=0 signifies that the payload comprises 8 bit samples. Otherwise, the samples are 10 bits. In the case of 10-bit video, the line length will exceed the maximum packet size allowed and so a line must be fragmented over two packets.
Z Reserved The scan line may range from 1 to 625 inclusive. The scan offset field is used to allow fragmentation of scan lines over multiple packets.

So, a suitable position for the synchronisation flag is one bit of the Z field. For example, if the flag is zero this could signify a "locked" condition, and if the flag is one, this could signify an "unlocked" condition. Optionally, a further bit could be used to differentiate between an "unlocked but non-varying" condition and an "unlocked and varying phase" condition.

The synchronisation flag is preferably included in each packet, but could (for example) be included only when the RTP M flag is set, or only when the BT.656 V flag is set, and so on.

The embodiments of the invention described above may be implemented by hardware, software, programmable hardware such as an ASIC or FPGA, or by combinations of these. In so far as they are implemented, at least in part, using software-controlled data processing apparatus, it will be appreciated that a computer program providing such software control and a storage medium by which such a computer program is stored are envisaged as aspects of the present invention.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A video data network source device, comprising:
a detector configured to receive a video signal, a reference clock synchronization signal related to a source timing of said video signal, and a frame synchronization signal related to the source timing of said video signal, and to provide a synchronization output indicating whether said video signal is synchronized to said reference clock synchronization signal and said frame synchronization signal;
a packetizer configured to generate video data packets, each video data packet representing at least a portion of the video signal;
a multiplexer configured to multiplex said video data packets, timing data indicating a frequency and a phase of said reference clock synchronization signal and said frame synchronization signal, and synchronization data based on said synchronization output to produce network data packets, said synchronization data indicating whether said video signal is not synchronized to said reference clock synchronization signal and said frame synchronization signal; and
a launcher configured to launch said network data packets onto a packet-based data network.

2. The video data network source device according to claim 1, wherein
said synchronization data comprises a data flag of one or more bits within at least a subset of said video data packets.

3. The video data network source device according to claim 2, wherein
said data flag is within a packet header of the at least a subset of said video data packets.

4. The video data network source device according to claim 3, wherein
said video data packets are BT.656 data packets.

5. The video data network source device according to claim 4, wherein
said data flag is carried within a packet header of said BT.656 packets.

6. The video data network source device according to claim 1, wherein
said video data packets are Real Time Protocol (RTP) data packets.

7. A video data network device, comprising:
a network interface configured to receive network data packets including video data packets each representing at least a portion of a video signal, timing data indicating a frequency and a phase of a reference clock synchronization signal related to a source timing of said video signal and a frame synchronization signal related to the source timing of said video signal, and synchronization data, said synchronization data indicating whether said video signal is not synchronized to said reference clock synchronization signal and said frame synchronization signal;
logic configured to synchronize a local reference clock synchronization signal and a local frame synchronization signal in accordance with said timing data;
logic configured to output said video signal in accordance to said local reference clock synchronization signal and said local frame synchronization signal; and
logic configured to generate a visible indicator associated with said video signal based on said synchronization data, said visible indicator indicating when the video signal is not synchronized to said reference clock synchronization signal and said frame synchronization signal.

8. The video data network device according to claim 7, wherein
said visible indicator comprises a visible modification of said video signal.

9. The video data network device according to claim 8, wherein
said visible indicator comprises a modification of the appearance of at least some pixels represented by said video signal.

10. The video data network device according to claim 9, wherein
said visible indicator comprises a readable message superposed on at least a portion of images represented by said video signal.

11. The video data network device according to claim 8, wherein
said visible indicator comprises a modification of a phase of said video signal with respect to at least one of said local reference clock synchronization signal and said local frame synchronization signal.

12. The video data network device according to claim 11, wherein
said visible indicator comprises a modification of said phase of said video signal so as to simulate a frame roll.

13. A video data network, comprising:
at least one source device including
a detector configured to receive a video signal, a reference clock synchronization signal related to a source timing of said video signal, and a frame synchronization signal related to the source timing of said video signal, and to provide a synchronization output indicating whether said video signal is synchronized to said reference clock synchronization signal and said frame synchronization signal,
a packetizer configured to generate video data packets, each video data packet representing at least a portion of the video signal,
a multiplexer configured to multiplex said video data packets, timing data indicating a frequency and a phase of said reference clock synchronization signal and said frame synchronization signal, and synchronization data based on said synchronization output to produce network data packets, said synchronization data indicating whether said video signal is not synchronized to said reference clock synchronization signal and said frame synchronization signal; and
a launcher configured to launch said network data packets onto a packet-based data network; and at least one destination device including
a network interface configured to receive said network data packets including said video data packets, said timing data indicating said frequency and said phase of said reference clock synchronization signal and said frame synchronization signal, and said synchronization data, said synchronization data indicating whether said video signal is not synchronized to said reference clock synchronization signal and said frame synchronization signal,
logic configured to synchronize a local reference clock synchronization signal and a local frame synchronization signal to said reference clock synchronization signal and said frame synchronization signal using said timing data,
logic configured to output said video signal in accordance to said local reference clock synchronization signal and said local frame synchronization signal,
logic configured to generate a visible indicator associated with said video signal based on said synchronization data, said visible indicator indicating when the video signal is not synchronized to the reference clock synchronization signal and the frame synchronization signal, and
a network connection providing data communication between the at least one source device and the at least one destination device.

14. A method of operation of a video data network source device, comprising:
receiving a video signal, a reference clock synchronization signal related to a source timing of said video signal, and a frame synchronization signal related to the source timing of said video signal;
providing a synchronization output indicating whether said video signal is synchronized to said reference clock synchronization signal and said frame synchronization signal;
generating video data packets, each video data packet representing at least a portion of the video signal;
multiplexing said video data packets, timing data indicating a frequency and a phase of said reference clock synchronization signal and said frame synchronization signal, and synchronization data based on said synchronization output to produce network data packets, said synchronization data indicating whether said video signal is not synchronized to said reference clock synchronization signal and said frame synchronization signal; and
launching said network data packets onto a packet-based data network.

15. A method of operation of a video data network device, comprising:
receiving network data packets including video data packets each representing at least a portion of a video signal, timing data indicating a frequency and a phase of a reference clock synchronization signal related to a source timing of said video signal and a frame synchronization signal related to the source timing of said video signal, and synchronization data, said synchronization data indicating whether said video signal is not synchronized to said reference clock synchronization signal and said frame synchronization signal;

synchronizing a local reference clock synchronization signal and a local frame synchronization signal to said reference clock synchronization signal and said frame synchronization signal using said timing data;

outputting said video signal in accordance to said local reference clock synchronization signal and said local frame synchronization signal; and generating a visible indicator associated with said video signal based on said synchronization data, said visible indicator indicating when the video signal is not synchronized to said reference clock synchronization signal and said frame synchronization signal.

16. A non-transitory computer-readable storage medium storing computer-readable instructions thereon, the computer-readable instructions, when executed by a processor, cause the processor to perform steps, comprising:

receiving network data packets including video data packets each representing at least a portion of a video signal, timing data indicating a frequency and a phase of a reference clock synchronization signal related to a source timing of said video signal and a frame synchronization signal related to the source timing of said video signal, and synchronization data, said synchronization data indicating whether said video signal is not synchronized to said reference clock synchronization signal and said frame synchronization signal;

synchronizing a local reference clock synchronization signal and a local frame synchronization signal to said reference clock synchronization signal and said frame synchronization signal using said timing data;

outputting said video signal in accordance to said local reference clock synchronization signal and said local frame synchronization signal; and generating a visible indicator associated with said video signal based on said synchronization data, said visible indicator indicating when the video signal is not synchronized to said reference clock synchronization signal and said frame synchronization signal.

17. A non-transitory computer-readable storage medium storing computer-readable instructions thereon, the computer-readable instructions, when executed by a processor, cause the processor to perform steps, comprising:

receiving a video signal, a reference clock synchronization signal related to a source timing of said video signal, and a frame synchronization signal related to the source timing of said video signal;

providing a synchronization output indicating whether said video signal is synchronized to said reference clock synchronization signal and said frame synchronization signal;

generating video data packets, each video data packet representing at least a portion of the video signal;

multiplexing said video data packets, timing data indicating a frequency and a phase of said reference clock synchronization signal and said frame synchronization signal, and synchronization data based on said synchronization output to produce network data packets, said synchronization data indicating whether said video signal is not synchronized to said reference clock synchronization signal and said frame synchronization signal; and launching said network data packets onto a packet-based data network.

\* \* \* \* \*